T. MOSS.
CARTON SEALING MACHINE.
APPLICATION FILED MAR. 11, 1910.
990,491.
Patented Apr. 25, 1911.
2 SHEETS—SHEET 1.
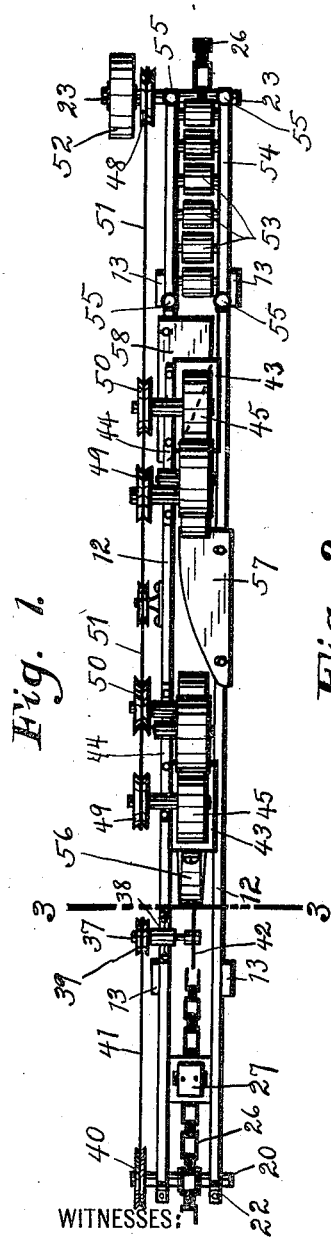
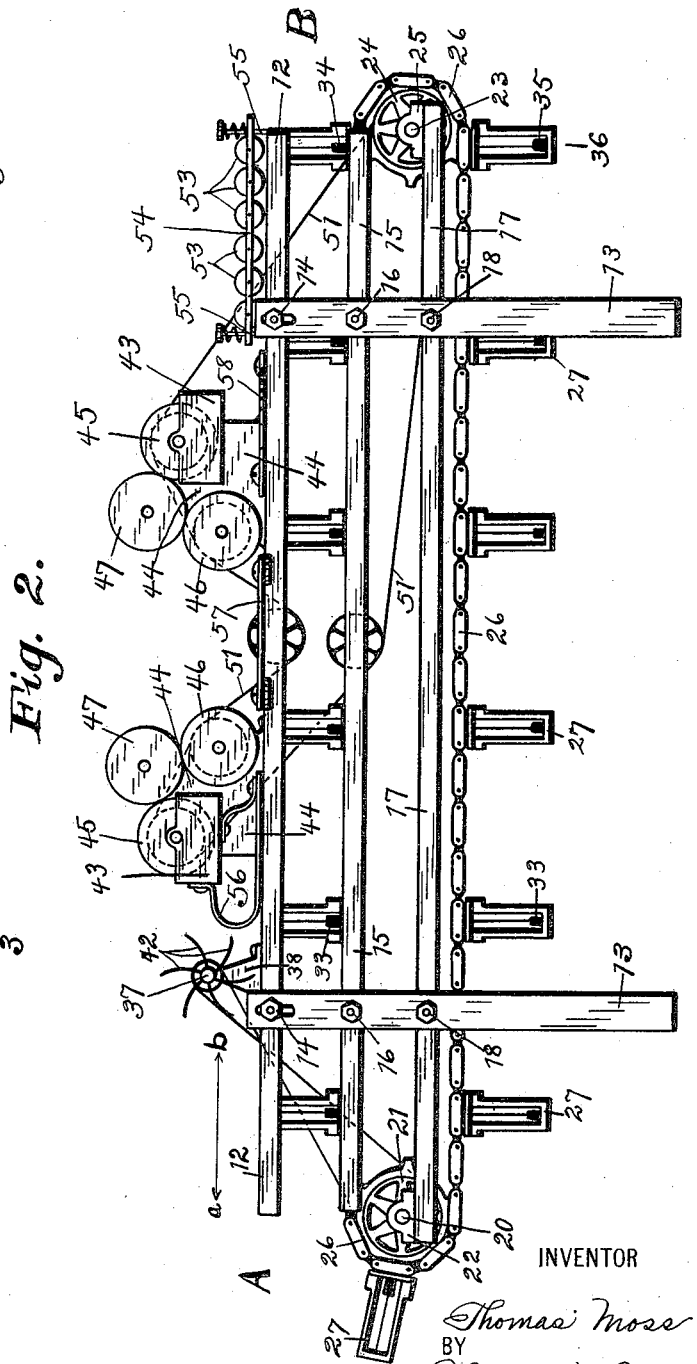
WITNESSES:
INVENTOR
Thomas Moss
BY
Thomas W. Colson
ATTORNEY T. MOSS.
CARTON SEALING MACHINE.
APPLICATION FILED MAR. 11, 1910.
990,491.
Patented Apr. 25, 1911.
2 SHEETS—SHEET 2.
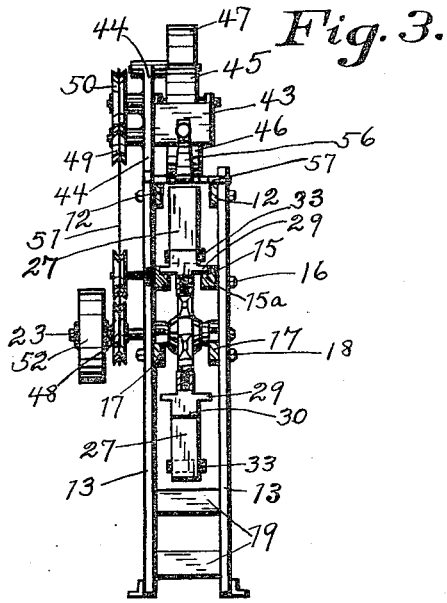
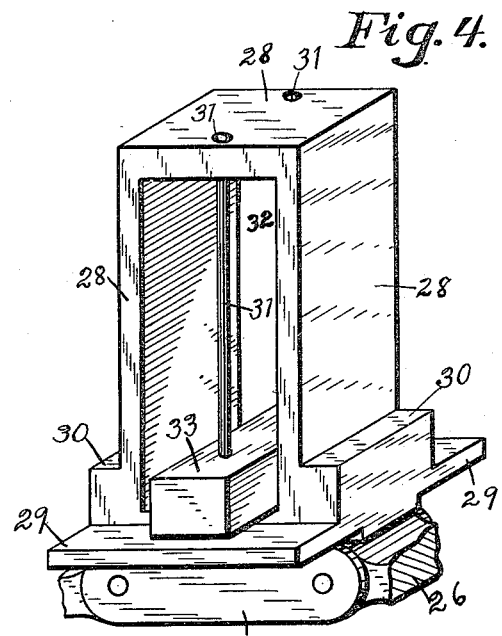
 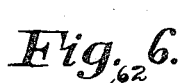 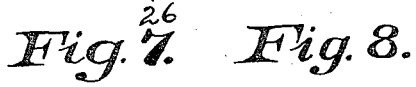
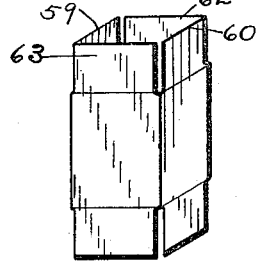 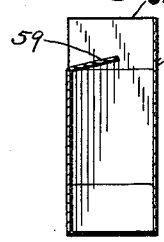  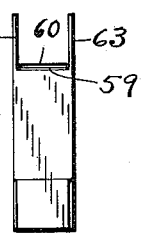
  
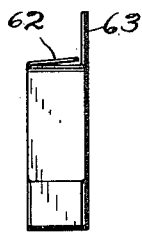 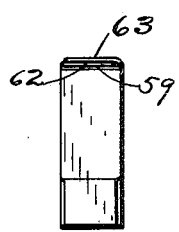 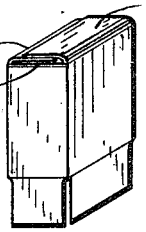
WITNESSES:
Myrtle E. Colson
U. M. Defrees
INVENTOR
Thomas Moss
BY
Thomas W. Colson
ATTORNEY
THE NORRIS PETERS CO., WASHINGTON, D. C.

UNITED STATES PATENT OFFICE.

THOMAS MOSS, OF VALLEY MILLS, INDIANA.

CARTON-SEALING MACHINE.

990,491.  Specification of Letters Patent.  Patented Apr. 25, 1911.

Application filed March 11, 1910. Serial No. 548,686.

*To all whom it may concern:*

Be it known that I, THOMAS MOSS, a citizen of the United States, and a resident of Valley Mills, in the county of Marion and State of Indiana, have invented certain new and useful Improvements in Carton-Sealing Machines, of which the following is a specification.

My improvement relates to machines for folding and sealing the bottoms of knocked-down paper cartons, and the object of my invention is to provide a machine which is simple in construction and operation as hereinafter described and claimed. I attain these objects by means of the mechanism illustrated in the accompanying drawings, in which—

Figure 1 is a top view of the machine; Fig. 2 is a side elevation of the same; Fig. 3 is a sectional elevation of the same taken along the line 3—3 in Fig. 1; Fig. 4 is an enlarged view, in perspective, of the form for holding the carton; Fig. 5 is an enlarged view, in perspective, of the carton ready to be fed into the machine; Fig. 6 is a sectional side elevation of the same showing the first flap folded down; Fig. 7 is a similar view showing the first and second flaps folded down; Fig. 8 is an edge elevation of the carton ready to pass under the first paste roller; Fig. 9 is a similar view showing the first, second and third flaps folded down ready to be passed under the second paste roller; Fig. 10 is a similar view showing the carton with all of the flaps folded down ready to pass under the setting rollers; and Fig. 11 is a view, in perspective, of the carton after it comes out of the machine.

Similar numerals of reference indicate similar parts throughout the several views.

Referring to the drawings, the frame consists of the top rails 12 removably secured to the posts 13, as at 14, and provided to support the folding and sealing mechanism; the intermediate rails 15 rigidly secured to said posts, as at 16, and provided with a track 15ª to guide and support the carton forms on the upper half of the sprocket chain, as described later; the lower rails 17 rigidly secured to said posts 13, as at 18; and, the cross braces 19 which connect said posts 13. The sprocket shaft 20, having a sprocket wheel 21 secured thereon, is journaled in bearings 22, which bearings are secured to the forward ends of the lower rails 17, and the sprocket shaft 23, having the sprocket wheel 24 secured thereon, is journaled in the bearings 25 which are secured at or near the rear ends of said lower rails 17. The reference to "forward ends of said lower rails 17" indicating the ends situated in the forward end or the end of the machine at which the cartons are fed (A, Fig. 2), and the reference to "rear ends of said lower rails 17" indicating the ends situated at the rear end or the end of the machine from which the cartons are delivered after being sealed (B, Fig. 2).

The sprocket chain 26 is operatively attached to the sprocket wheels 21 and 24 and is provided with suitable links to attach the carton holding forms 27. Said carton holding forms are alike in form and construction. The hollow rectangular body portion 28 (Fig. 4) is provided with the supporting ears 29 to slide in the track 15ª of the intermediate rails 15, and the shoulders 30 to form a stop for the carton. Two parallel rods 31 are secured at their ends in said hollow body portion and extend longitudinally of the rectangular opening 32 of said rectangular body portion, and a weight 33, extending transversely of said rectangular opening is slidably mounted on said parallel rods. Said weight is of sufficient thickness to help support the carton while being folded and sealed and heavy enough to fall from the position indicated at 34, Fig. 2, to the position indicated at 35, Fig. 2, thereby removing the carton from the carton holding form by the time the latter reaches the position indicated at 36.

When it is desired to use cartons of a different size, the carton holding forms are exchanged for others of the desired size, and the top rails 12 are lowered or raised in the slots at 14 of the posts 13, to the required height.

The shaft 37 is journaled in the bearing 38 which is secured to one of the top rails 12, and the pulley 39 is rigidly secured on one end of said shaft and operatively connected to the sprocket shaft 20 by means of the pulley 40 and belt 41 to turn faster and in the opposite direction, and a hub having curved radial arms 42 to engage the flaps 59 and 60 of the carton, is secured to its other end.

The two paste dispensing devices are similar in form and construction, each having a paste containing vessel 43 secured at one of its sides to the housing 44, which housing is secured to one of the top rails 12, a roller 45 journaled in said housing to run in the paste, a roller 46, also journaled in said housing, to apply the paste to the carton, and the roller 47, also journaled in said housing, to take the paste from the roller 45 and deliver it to the roller 47. Said rollers 45 and 47 are operatively connected with the sprocket shaft 23 by means of the pulley 48, the pulleys 49 and the pulleys 50 and the belt 51, to turn therewith.

Power is delivered to the machine by means of connecting a source of power with the pulley 52 with a suitable belt.

A plurality of setting rollers 53 are journaled in bearings 54, which bearings are resiliently secured to the top rails 12, as at 55.

The folding member 56 is secured, at its ends, to the paste containing vessel 43, nearest the forward part of the machine, and is of such a shape and length to fold the second flap 60 of the carton down and hold it down until it reaches the first paste roller.

The angular folding plate 57 is adjustably secured to one of the top rails 12 in a manner to engage the third flap 62 of the carton to fold it down and hold it until it reaches the second paste roller, and the second angular folding plate 58 is adjustably secured to the other top rail 12 in a manner to engage the fourth flap 63 of the carton and fold it down and hold it until it reaches the setting rollers 53.

The operation is as follows:—The machine is set in motion and a carton opened as shown in Fig. 5 and placed on one of the carton holding forms 27 while it is traveling from the position A to one at B in Fig. 2 and passed under the curved radial arms 42 which folds the flap 59 and bends the flap 60 as indicated by the dotted line in Fig. 6. Said arms 42 hold the flap 59 down until the folding member 56 folds the flap 60 as indicated in Fig. 7, and said folding member 56 holds the flaps 59 and 60 down until the carton reaches the first paste dispensing roller 46 which deposits a layer of paste on the top sides of the flaps 59 and 60 at 61 in Fig. 8. The carton next passes under the angular folding plate 57 which folds the flap 62 as indicated in Fig. 9 and holds it down until it reaches the second paste dispensing roller 46 which deposits a layer of paste on the top surface of said flap 62, it then passes under the angular folding plate 58 which folds the flap 63 as indicated in Fig. 10 and under the setting rollers 53 which are sufficient in number to hold all of the flaps firmly together until the paste sets to cement the flaps together, and lastly said carton is carried around the sprocket wheel 24 until it reaches the lower side of said sprocket wheel when the weight 33 falls from the position shown at 34 to one shown at 35 (Fig. 2) which removes the carton from the machine.

By securing stationary folding and sealing devices in their proper order and passing the cartons under them I save much time and eliminate complicated machinery used hithertofore in this class of machines.

What I claim as new and desire to secure by Letters Patent is,

A carton sealing machine comprising a frame, a sprocket chain mounted in said frame to travel longitudinally of such frame, a plurality of carton holding forms secured on said sprocket chain, a housing secured on said frame, a shaft rotatively mounted in said housing and extending transversely of said frame, a plurality of radial arms secured to said shaft in a manner to engage and fold the first edge flap of the cartons, a stationary curved folding member secured to said frame and adapted to fold the second edge flap of the cartons, a paste dispensing device secured to said frame and adapted to apply a layer of paste to the top surfaces of the edge flaps of the cartons, a stationary triangular plate secured to said frame and adapted to fold the first side flap of the cartons, a second paste dispensing device secured to said frame and adapted to apply a layer of paste to the top surface of the first side flap of the cartons, a second stationary triangular plate secured to said frame and adapted to fold the second flap of the cartons, a plurality of setting rollers mounted in said frame and adapted to hold all of the flaps down until the paste sets, and means for imparting motion to said sprocket chain, said radial arms and said paste dispensing devices substantially as described.

In witness whereof, I hereunto set my hand in the presence of two witnesses.

THOMAS MOSS.

Witnesses:
 THOMAS Moss, Jr.,
 FRANCIS M. SPRINGER.

---

Copies of this patent may be obtained for five cents each, by addressing the "Commissioner of Patents, Washington, D. C."